(12) United States Patent
Lin et al.

(10) Patent No.: US 9,529,452 B2
(45) Date of Patent: Dec. 27, 2016

(54) TOUCH INPUT DEVICE

(71) Applicant: Raydium Semiconductor Corporation, Hsinchu (TW)

(72) Inventors: Te-Chang Lin, Hsinchu (TW); Chien-Kuo Wang, Zhubei (TW); Chia-Hsiu Lin, Hsinchu (TW); Ya-Ling Lu, Pingtung (TW); Yi-Ming Chen, Tainan (TW); Wei-Yuan Cheng, Taichung (TW); Yu-Sheng Yeh, Pingzhen (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 16 days.

(21) Appl. No.: 14/310,871

(22) Filed: Jun. 20, 2014

(65) Prior Publication Data

US 2015/0002476 A1    Jan. 1, 2015

(30) Foreign Application Priority Data

Jun. 27, 2013    (TW) .............................. 102123038 A

(51) Int. Cl.
*G06F 3/0346*    (2013.01)
*G06F 3/0488*    (2013.01)
*G06F 3/0354*    (2013.01)

(52) U.S. Cl.
CPC ......... *G06F 3/0346* (2013.01); *G06F 3/03545* (2013.01); *G06F 3/04883* (2013.01)

(58) Field of Classification Search
None
See application file for complete search history.

(56) References Cited

U.S. PATENT DOCUMENTS

2014/0253521 A1*    9/2014    Hicks .................. G06F 3/03545
                                                            345/179

* cited by examiner

*Primary Examiner* — Kenneth B Lee, Jr.

(57) ABSTRACT

A touch input device includes a touch end, a sensing module, and a receiving module. The sensing module includes a sensing unit and a signal operation unit. The sensing unit detects a relative angle between the touch end and a display touch surface to generate a motion signal. The signal operation unit is coupled with the sensing unit and generates a result signal according to the motion signal. The receiving module includes a receiving end and a demodulator unit. The receiving end receives the result signal; the demodulator is coupled with the receiving end, wherein the receiving end transmits the result signal to the demodulator unit, and the demodulator unit generates a function signal according to the result signal.

18 Claims, 8 Drawing Sheets

TOUCH INPUT DEVICE

BACKGROUND OF THE INVENTION

Field of the Invention

The present invention generally relates to a touch input device. Particularly, the present invention relates to a touch input device, which can improve the input efficiency and provide multiple sensing angles.

Description of the Related Art

In conventional touch input devices, the touch action is mostly conducted with a finger. For example, touch input devices include industry computers, tablet computers, portable communication devices, automatic teller machines, laptop computers, electronic books, or other electronic devices. Touch input devices are widely used because of their instinct operations. However, as the size of touch screen shrinks, the sensitivity of touch sensing has to be promoted. In practical, fingers cannot make a very precise touch, impairing the sensing accuracy of the touch input device.

In recent years, research and development people attempt to utilize the touch pen to improve the precision of touch. However, conventional touch pens need to maintain at a constant angle for touch sensing, limiting the sensing efficiency. Moreover, conventional touch pens only have touch function and cannot provide multiple functions according to the writing angle. In practical applications, the touch pen is made of plastics to provide a touch feeling similar to finger. However, once the writing speed increases, the touch sensing becomes very poor.

SUMMARY OF THE INVENTION

It is an object of the present invention to provide a touch input device, which can improve the input efficiency and provide multiple sensing angles.

It is another object of the present invention to provide a touch input device, which uses a three-axis accelerometer to sense at different angles.

It is a further object of the present invention to provide a touch input device having a signal operation unit, which has different functions corresponding to different angles.

In one aspect, the present invention provides a touch input device including a touch end, a sensing module, and a receiving module. In one embodiment, the sensing module includes a sensing unit and a signal operation unit, wherein the sensing unit detects a relative angle between the touch end and a display touch surface to generate a motion signal. The signal operation unit is coupled with the sensing unit and generates a result signal according to the motion signal. In addition, the receiving module includes a receiving end and a demodulator unit, wherein the receiving end receives the result signal. The demodulator unit is coupled with the receiving end, wherein the receiving end transmits the result signal to the demodulator unit, and the demodulator unit generates a function signal according to the result signal.

In comparison with the prior art, the touch input device of the present invention utilizes the sensing unit to detect the relative angle between the touch end and the display touch surface so as to generate a motion signal, wherein the motion signal corresponds to a respective function. For example, the sensing unit can detect an angle of the touch end relative to the display touch surface to generate a corresponding motion signal, wherein different angles respectively correspond to different motion signals. Moreover, each motion signal corresponds to a different function, wherein the function may include receiving/sending an email, displaying a selection list, moving the pointer, or other functions. In addition, the touch end is preferably an electrode, and the electrode can electrically couple with the display touch surface to provide a better sensing effect, effectively improving the poor sensing problem.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

According to one embodiment of the present invention, a touch input device is provided. Particularly, the touch input device of the present invention includes a touch pen, which can generate different functions in response to the change in writing angle.

Figure 1:
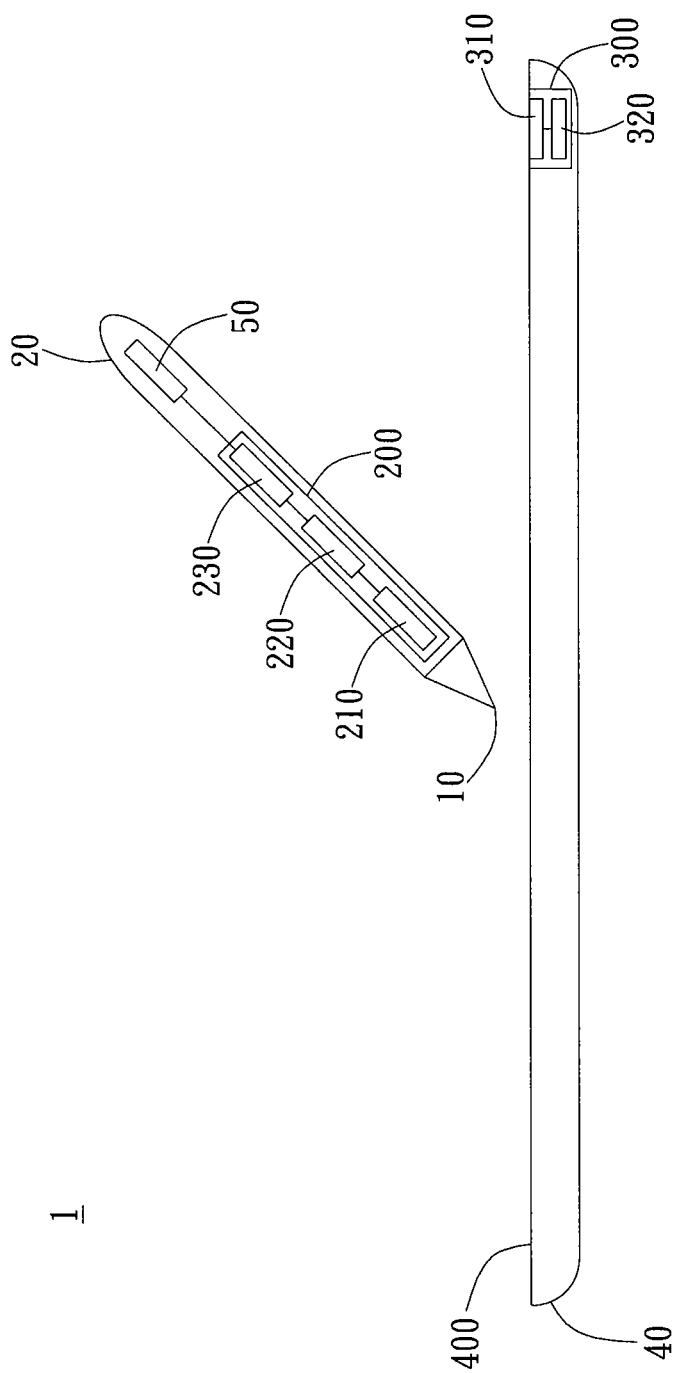
FIG. 1 is a schematic view of the touch input device in an embodiment of the invention.

Please refer to FIG. 1, which is a schematic view of the touch input device in an embodiment of the invention. As shown in FIG. 1, the touch input device 1 includes a touch end 10, a shaft member 20, a sensing module 200, a receiving module 300, a display integration module 40, and a power supply module 50. In this embodiment, the sensing module 200 is disposed in the shaft member 20; the touch end 10 is disposed on one end of the shaft member 20; the power supply module 50 supplies power required by the touch input device 1. Moreover, the display integration module 40 includes a display touch surface 400. In a practical application, the shaft member 20 together with the touch end 10 forms a touch pen, wherein the touch pen can write on the display touch surface 400 to enable the touch control function. Moreover, the receiving module 300 is disposed in the display integration module 40, but is not limited thereto.

It is noted that the sensing module 200 includes a sensing unit 210, a signal-amplifying unit 220, and a signal operation unit 230, wherein the signal-amplifying unit 220 is coupled between the sensing unit 210 and the signal operation unit 230. In a practical application, the sensing unit 210 detects the relative angle between the touch end 10 and the display touch surface 400 to generate a motion signal. The signal-amplifying unit 220 amplifies the motion signal and transmits the motion signal to the signal operation unit 230.

In this embodiment, the sensing unit 210 is a three-axis accelerometer that can sense the relative angle and position of the touch end 10 and the shaft member 20 with respect to the display touch surface 400. When the touch end 10 contacts or touches the display touch surface 400, the touch end 10 will produce a feedback force, and the sensing unit 210 will determine whether the touch end 10 physically contacts the display touch surface 400 based on the feedback force. For example, the touch end 10 can be piezoelectric material and can generate voltage based on whether the touch end 10 receives pressure, so that the sensing unit 210 can sense the status of the touch end 10. In other embodiments (not shown), the sensing unit 210 is disposed on the surface of the touch end 10, so that the sensing unit can directly sense the relative angle between the touch end 10 and the display touch surface 400.

In addition, the signal-amplifying unit 200 is an amplifier, which can amplify the amplitude of the motion signal to increase the strength of signal. It is noted that the signal operation unit 230 generates the result signal according to the motion signal. For example, the signal operation unit 230 includes a lookup table (LUT), wherein each motion signal corresponds to a respective result signal, so that the signal operation unit 230 can determine the result signal according to the amplitude of the motion signal. It is noted that in other embodiments, the signal operation unit can determine the result signal based on other logic operations and is not limited to the embodiment.

As shown in FIG. 1, the receiving module 300 includes a receiving end 310 and a demodulator unit 320, wherein the demodulator unit 320 is coupled with the receiving end 310. Moreover, the signal operation unit 230 transmits the result signal to the receiving end 310 by a communication protocol, wherein the communication protocol includes wire communication protocol and wireless communication protocol. As shown in FIG. 1, the receiving end 310 is coupled with the display touch surface 400 of the display integration module 40. When the touch end 10 contacts the display touch surface 400, the signal operation unit 230 transmits the result signal to the receiving end 310 through the touch end 10. Particularly, the signal operation unit 230 transmits the result signal to the receiving end 310 by the touch end 10 physically contacting the display touch surface 400. In other embodiments, even if the touch end 10 does not physically contact the display touch surface 400, the signal operation unit 230 can transmit the result signal to the receiving end 310 by wireless communication protocol.

In a practical application, the receiving end 310 receives the result signal and transmits the result signal to the demodulator unit 320, and the demodulator unit 320 generates a corresponding function signal based on the result signal. The demodulator unit 320 then transmits the function signal to the function processing module (not shown) of the display integration module 40, so that the display integration module 40 can perform a predetermined function. For example, the predetermined function includes receiving/sending an email, displaying a selection list, entering the power-saving mode, moving the orientation, but is not limited thereto.

It is noted that the sensing unit 210 detects the relative angle of the shaft member 20 and the touch end 10 with respect to the display touch surface 400 to generate the motion signal. The sensing unit 210 has a reference direction and can determine the direction of sensing angle based on the reference direction. Moreover, the sensing unit 210 determines the relative angle between the touch end 10 and the display touch surface 400 based on the reference direction and then determines the magnitude of the angle between the shaft member 20 and the display touch surface 400. Particularly, the sensing unit 200 can detect the relative angle of the shaft member 20 and the touch end 10 with respect to the display touch surface 400 to generate the motion signal, so that the signal operation unit 230 can generate the result signal based on the motion signal so as to perform different predetermined functions.

Figure 2:
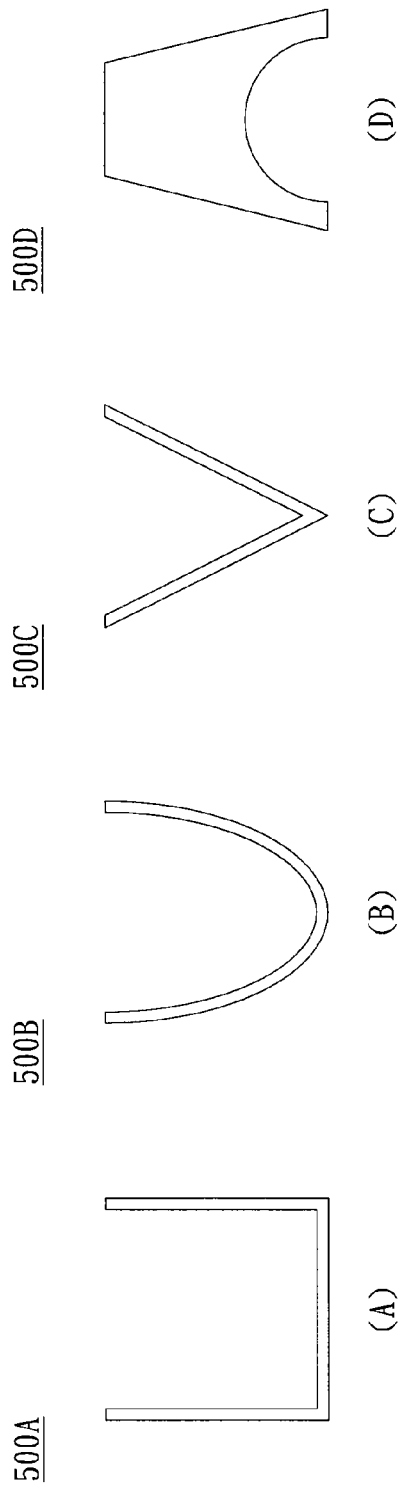
FIG. 2(A)-(D) are schematic views of different embodiments of the touch end.

Please refer to FIG. 2, which illustrates schematic views of embodiments of the touch end. As shown in FIG. 2(A), FIG. 2(B), FIG. 2(C), and FIG. 2(D), the shape of the touch end includes a plane, a curve face, or a conical face, wherein the shape of the touch end 500A is a plane; the shape of the touch end 500B is a curve face; the shape of the touch end 500C is a conical face; the shape of the touch end 500D is an inner concave curve face. Moreover, the material of the touch ends 500A~500D includes piezoelectric material. When the touch end approaches the display touch surface 400, the touch end can electrically couple with the display touch surface 400. That is, since the entire surface of the touch end 500A~500D is an electrode to achieve a full touch surface sensing, instead of local touch sensing at a specific angle. Moreover, since the touch end 500A~500D is an electrode, which can electrically couple with the display touch surface 400 to provide a better sensing performance, effectively solving the poor sensing problem.

Figure 3:
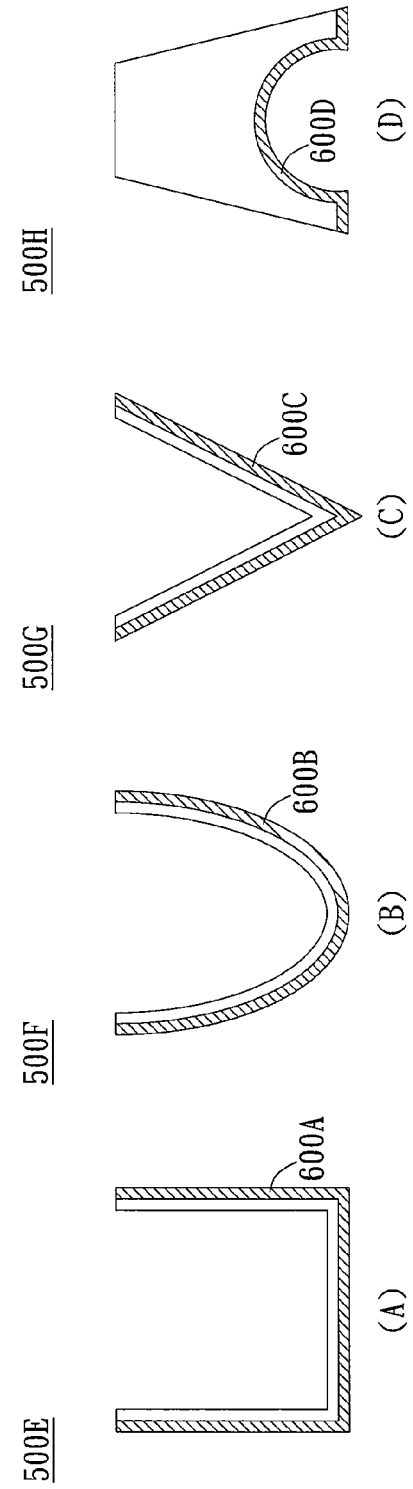
FIG. 3(A)-(D) are schematic views of different embodiments of the touch end.

Furthermore, as shown in FIG. 3, FIG. 3 illustrates other embodiments of the touch end. As shown in FIG. 3(A), FIG. 3(B), FIG. 3(C), and FIG. 3(D), the shape of touch end 500E, touch end 500F, touch end 500G, and touch end 500H are respectively a plane, a curve face, a conical face, and an inner concave curve face. It is noted that touch ends 500E~500H respectively have outer layers 600A~600D, wherein the outer layers 600A~600D can be a soft thin layer and the material thereof includes plastics or soft conductors to prevent scratch of the display touch surface 400.

Figure 4A:
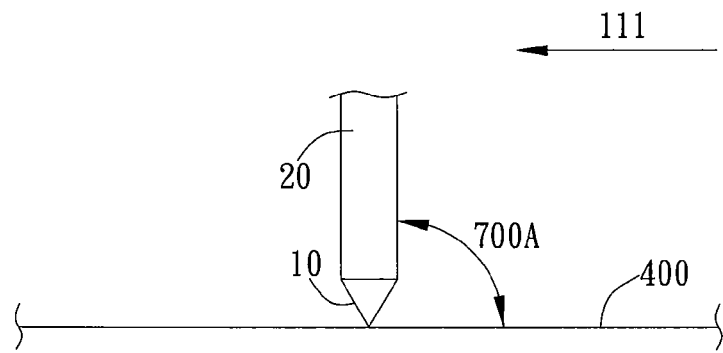
FIG. 4A is a schematic view of the shaft member with the touch end contacting the display touch surface in an embodiment of the invention.
Figure 4B:
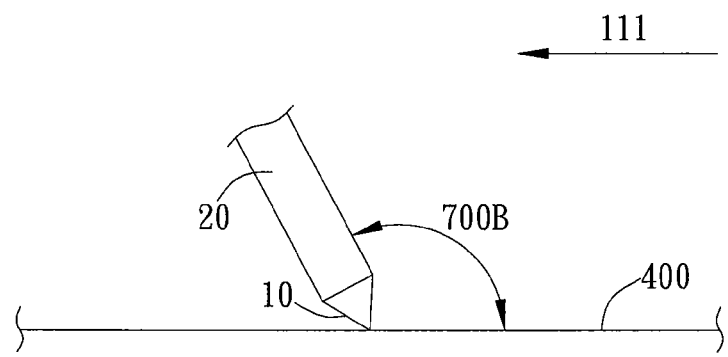
FIG. 4B is a schematic view of the shaft member with the touch end contacting the display touch surface in another embodiment of the invention.
Figure 4C:
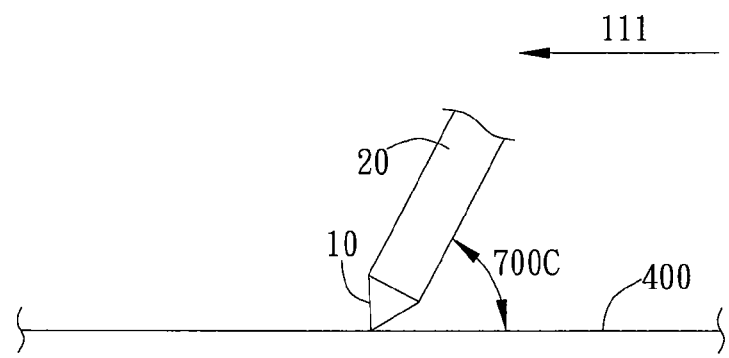
FIG. 4C is a schematic view of the shaft member with the touch end contacting the display touch surface in another embodiment of the invention.

Referring to FIGS. 4A to 4C, FIG. 4A is a schematic view of the shaft member with the touch end contacting the display touch surface in an embodiment; FIG. 4B is a schematic view of the shaft member with the touch end contacting the display touch surface in another embodiment; FIG. 4C is a schematic view of the shaft member with the touch end contacting the display touch surface in a further another embodiment.

As shown in FIG. 4A and FIG. 4B, the touch end 10 has a conical shape, wherein the touch end 10 contacts/touches the display touch surface 400, and the shaft member 20 includes a specific angle with the display touch surface 400, i.e. angle 700A in FIG. 4A and angle 700B in FIG. 4B. It is noted that the reference direction of the sensing unit 210 is the first direction 111, and the sensing unit 210 determines the value of the specific angle along the first direction. It is noted that users can change the reference direction based on operation preference and custom, not limited to the embodiment. In this embodiment, the motion signal includes touch signals ST1 and ST2. Moreover, when the touch end 10 contacts the display touch surface 400 and the shaft member 20 includes the specific angle 700A or 700B with the display touch surface 400, the sensing unit 210 correspondingly generates the touch signal ST1 or ST2. It is noted that the magnitude of the touch signals ST1 and ST2 (i.e. motion signals) is respectively proportional to the value of the specific angles 700A and 700B. That is, the sensing unit 210 detects the magnitude of the specific angle to generate voltage value and then generates touch signals of different magnitude.

In this embodiment, the angle 700A is 90 degrees; the angle 700B is 120 degrees, but not limited thereto. It is noted that the functions corresponding to the touch signals ST1 and ST2 are respectively functions of writing an email and sending an email. That is, the user can control the display integration module 40 to perform different functions by controlling the angle between the shaft member 20 and the display touch surface 400. It is noted that the user can perform a desired or corresponding function by merely adjusting the angle between the shaft member 20 and the display touch surface 400 without using other elements or performing further actions.

In addition, the motion signal includes a rest signal ST3. As shown in FIG. 4C, when the touch end 10 contacts and is positioned on the display touch surface 400 and the shaft member maintains at a rest angle 700C with respect to the display touch surface 400 for a predetermined period of time, the sensing unit 210 generates the rest signal ST3. In this embodiment, the predetermined period of time for the rest status is about 5 seconds, and the rest angle 700C is about 60 degrees, but not limited thereto. In addition, if the user intends to perform a standby function, merely adjusting the relative angle between the shaft member 20 and the display touch surface 400 for the predetermined period of time, the standby function will be activated without performing the writing on the display integration module 40 by the touch end 10.

Figure 5A:
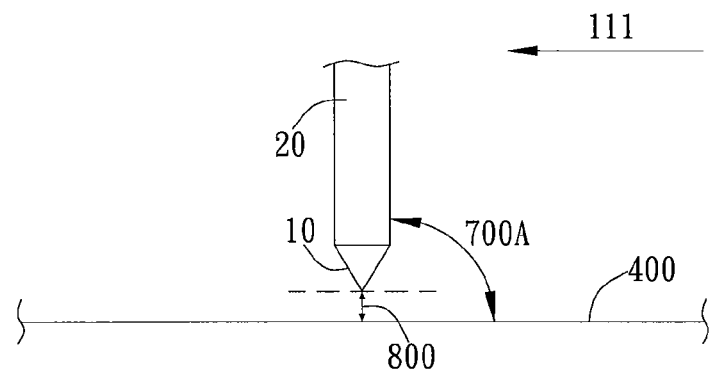
FIG. 5A is a schematic view of the touch end suspending over the display touch surface in an embodiment of the invention.
Figure 5B:
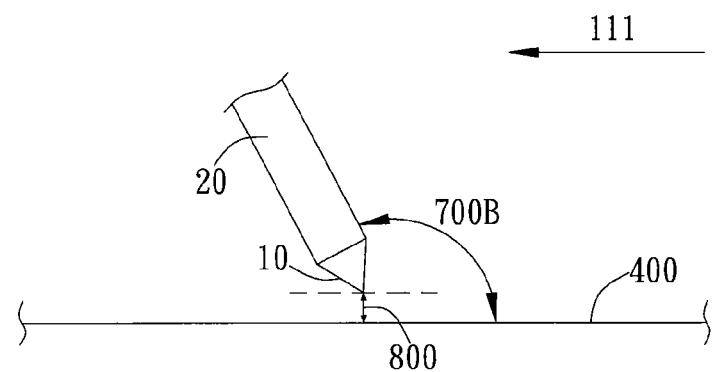
FIG. 5B is a schematic view of the touch end suspending over the display touch surface in another embodiment of the invention.
Figure 5C:
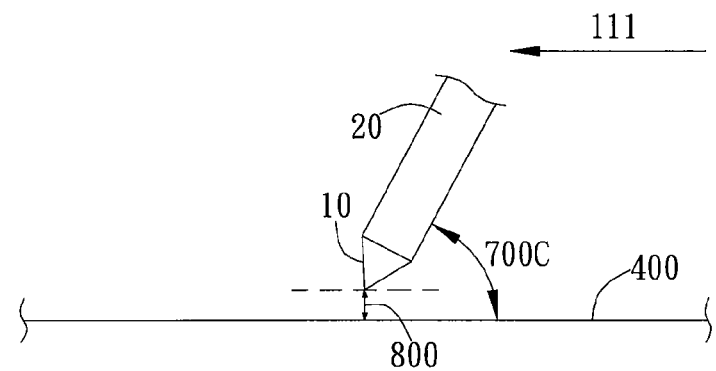
FIG. 5C is a schematic view of the touch end suspending over the display touch surface in another embodiment of the invention.

Referring to FIGS. 5A to 5C, FIG. 5A is a schematic view of the touch end suspending over the display touch surface in an embodiment; FIG. 5B is a schematic view of the touch end suspending over the display touch surface in another embodiment; FIG. 5C is a schematic view of the touch end suspending over the display touch surface in a further another embodiment.

In this embodiment, the motion signal includes floating signals SS1 and SS2. As shown in FIG. 5A and FIG. 5B, when the touch end 10 is away from or spaced apart from the display touch surface 400 by a floating distance 800 and the shaft member 20 includes the specific angle 700A or 700B with the display touch surface 400, the sensing unit 210 correspondingly generates the floating signal SS1 or SS2. It is noted that the functions corresponding to the floating signals SS1 and SS2 are respectively functions of displaying information of a link and opening the link, but not limited thereto. That is, user can execute a specific function by controlling the touch end 10 spaced apart from the display touch surface 400 by the floating distance 800 and adjusting the angle between the shaft member 20 and the display touch surface 400.

In addition, the motion signal includes a suspending signal SS3. As shown in FIG. 5C, when the touch end 10 is away from the display touch surface 400 by the floating distance 800 and the shaft member 20 maintains at a suspension angle 700C with respect to the display touch surface 400 for a predetermined period of time, the sensing unit 210 generates the suspending signal SS3. In this embodiment, the predetermined period of time for the suspension status is about 5 seconds, and the suspension angle about 700 C is 60 degrees, but not limited thereto. In a practical situation, if the user intends to perform the function of opening the main screen, merely adjusting the relative angle between the shaft member 20 and the display touch surface 400 for the predetermined period of time, the function of opening the main screen will be activated without performing the writing on the display integration module 40 through touch end 10.

Figure 6A:
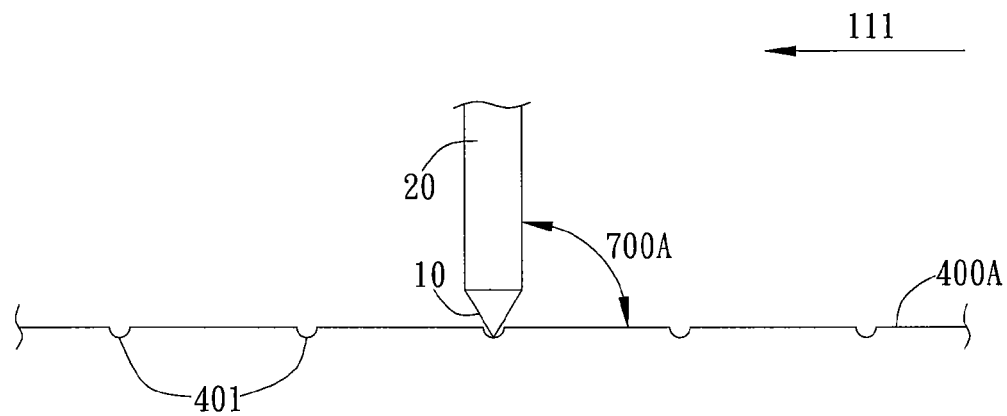
FIG. 6A is a schematic view of the touch end contacting the display touch surface in an embodiment of the invention.
Figure 6B:
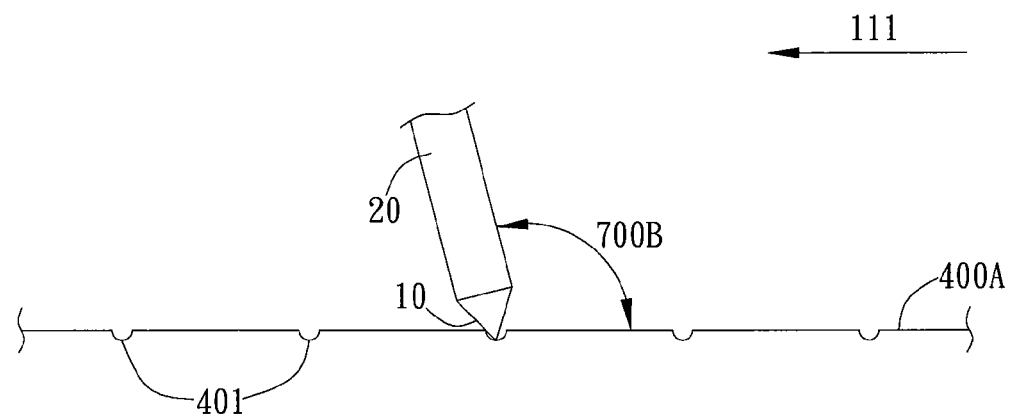
FIG. 6B is a schematic view of the touch end contacting the display touch surface in another embodiment of the invention.

Referring to FIG. 6A and FIG. 6B, FIG. 6A is a schematic view of the touch end contacting the display touch surface in another embodiment; FIG. 6B is a schematic view of the touch end contacting the display touch surface in a further another embodiment. As shown in FIG. 6A and FIG. 6B, the display integration module includes the display touch surface 400A, wherein the display touch surface 400A includes at least one touch hole 401 and the touch end 10 is positioned in one of the touch holes 401. It is noted that in this embodiment, since the display touch surface 400A has the touch holes 401, the shaft member 20 can rotate with the touch hole 401 as the center of rotation.

For example, the motion signal includes a rotating signal ST4. As shown in FIG. 6A and FIG. 6B, when the touch end 10 contacts and is positioned on the display touch surface 400A and the shaft member 20 rotates, with the touch end 10 as the center of rotation, a rotation angle along the reference direction, the sensing unit 210 generates the rotating signal ST4. In this embodiment, the reference direction is the first direction 111; the rotation angle is the difference of the angle 700A and the angle 700B, but not limited thereto. In addition, the magnitude of the rotating signal ST4 is proportional to the value of the rotation angle. That is, the sensing unit 210 detects the magnitude of the rotation angle to generate voltage value and then generates rotating signals of different magnitude.

In a practical application, the function corresponding to the rotating signal ST4 is a joystick type movement, but not limited thereto. That is, the sensing unit 210 can determine the shift degree of coordination based on the difference of the angle 700A and the angle 700B.

Figure 7A:
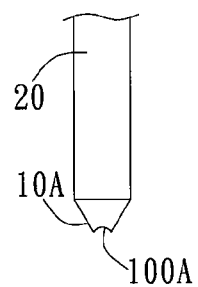
FIG. 7A is a schematic view of the touch end in another embodiment of the invention.
Figure 7B:
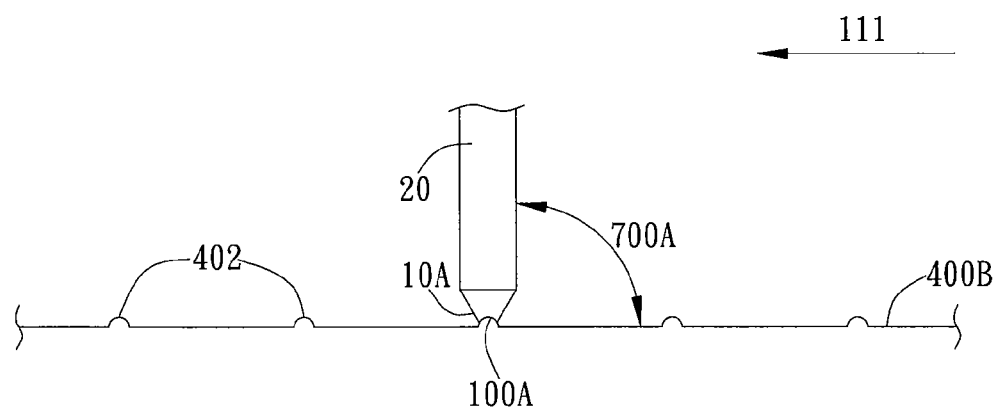
FIG. 7B is a schematic view of the touch end contacting the display touch surface in another embodiment of the invention.

Moreover, referring to FIG. 7A and FIG. 7B, FIG. 7A is a schematic view of the touch end in another embodiment of the invention; FIG. 7B is a schematic view of the touch end contacting the display touch surface in another embodiment of the invention. As shown in FIG. 7A, the shape of the touch end 10A includes an inner concave curve shape, and the touch end 10A has an inner concave face 100A, wherein the radian of the inner concave face 100A is about $2\pi/3$, but not limited thereto.

As shown in FIG. 7B, the display integration module includes a display touch surface 400B, wherein the display touch surface 400B includes at least one touch bump 402, and the touch end 10A is positioned on the touch bump 402. In a practical application, the touch bump 402 has a semi-circular shape, and the inner concave face 100A of the touch end 10A can slide on the touch bump 402, so that the shaft member 20 rotates with the touch end 10A as the center of rotation and the sensing unit 210 correspondingly generates the rotating signal ST4. In other words, the embodiment of FIG. 7B is a variant embodiment of FIG. 6A. The shape of the touch end 10A matches the touch bump 402 of the display touch surface 400B to facilitate the rotation of the touch end 10A on the touch bump 402.

Figure 8A:
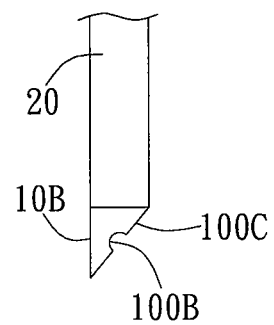
FIG. 8A is a schematic view of the touch end in another embodiment of the invention.
Figure 8B:
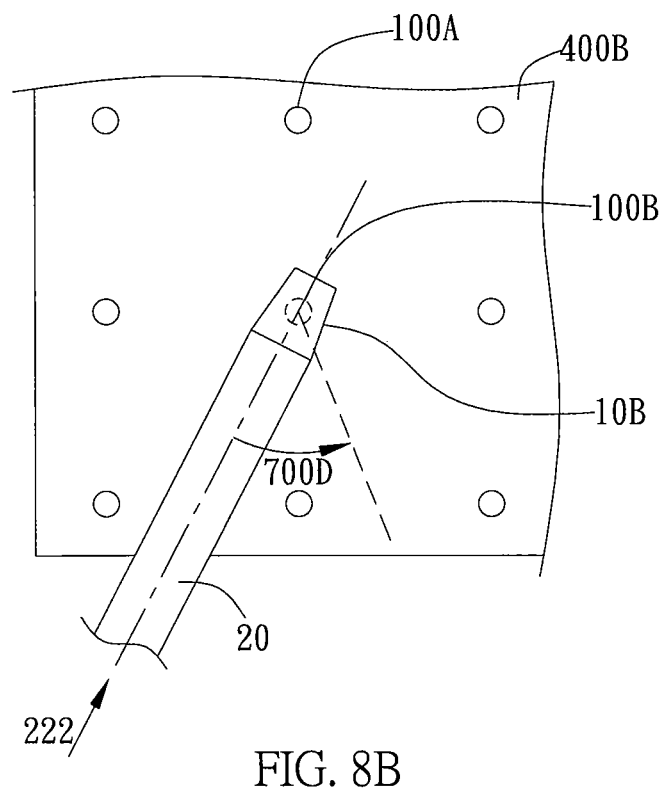
FIG. 8B is a schematic view of the touch end contacting the display touch surface.
Figure 8C:
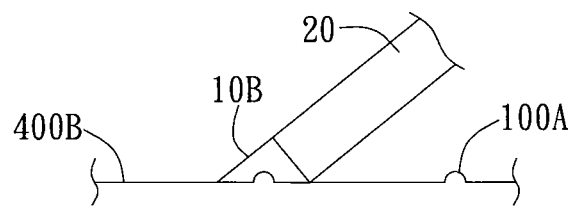
FIG. 8C is a cross-sectional view of the touch end contacting the display touch surface.

In addition, referring to FIG. 8A, FIG. 8A is a schematic view of the touch end in another embodiment of the present invention. As shown in FIG. 8A, the touch end 10B has a concave face 100B and an inclined face 100C, wherein the shape of the concave face 100B is a semi-circle. Referring to FIG. 8B and FIG. 8C, FIG. 8B is a schematic view of the touch end contacting the display touch surface; FIG. 8C is a cross-sectional view of the touch end contacting the display touch surface.

As shown in FIG. 8B and FIG. 8C, the concave face 100B is a section inwardly recessed and disposed in the middle area of the inclined face 100C, but not limited thereto. In a practical application, as shown in FIG. 8B and FIG. 8C, the touch end 10B contacts and is positioned on the display touch surface 400B, and the shaft member 20 swings a swing angle 700D with the touch end 10B as a center of swing. Particularly, the concave face 100B and the inclined face 100C respectively rotate on the touch bump 402 and the display touch surface 400B.

For example, the motion signal includes a swinging signal ST5. As shown in FIG. 8B and FIG. 8C, when the touch end 10B contacts and is positioned on the touch bump 402 of the display touch surface 400B and with the touch end 10B as the center of swing, the shaft member 20 swings clockwise or counterclockwise by the swing angle 700D, so that the concave face 100B and the inclined face 100C rotate along the display touch surface 400B, the sensing unit 210 will generate the swinging signal ST5. It is noted that the sensing unit determines the magnitude of the swing angle 700D based on a swinging reference direction. The swinging reference direction is the second direction 222. In this embodiment, the shaft member 20 swings counterclockwise by the swing angle 700D, but not limited hereto. In a practical application, the function corresponding to the swinging signal ST5 is zoom in and zoom out window, but not limited thereto. For example, when the shaft member 20 rotates counterclockwise, the zoom-in function is executed. When the shaft member 20 rotates clockwise, the zoom-out function is executed.

Figure 9:
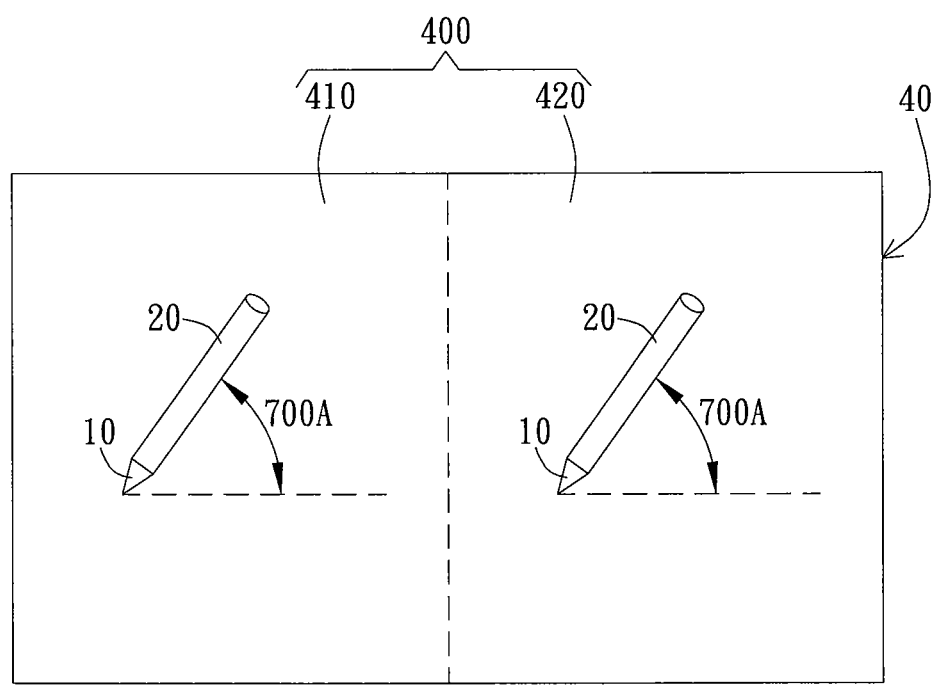
FIG. 9 is a schematic view of the display integration module in an embodiment of the invention.

Referring to FIG. 9, FIG. 9 is a schematic view of the display integration module in an embodiment of the invention. As shown in FIG. 9, the display touch surface 400 includes a first display touch face 410 and a second display touch face 420, wherein the motion signal generated by the sensing unit 210 when the touch end 10 acts on the first display touch face 410 and the motion signal generated by the sensing unit 210 when the touch end 10 acts on the second display touch face 420 are different. For example, when the shaft member 20 includes the angle 700A with the first display touch face 410, the function corresponding to the motion signal generated by the sensing unit 210 is writing an email. When the shaft member 20 includes the angle 700A with the second display touch face 420, the function corresponding to the motion signal generated by the sensing unit 210 is sending an email, but not limited thereto. In other words, The user can configure that a same action performed by the touch end 10 on the first display touch face 410 and the second display touch face 420 will correspond to different motion signals. Particularly, the display touch surface 400 can be further divided into multiple display touch areas and not limited to two display touch faces as described above.

In comparison with the prior art, the touch input device 1 of the present invention utilizes the sensing unit 210 to detect the relative angle between the touch end 10 and the display touch surface 400 so as to generate a motion signal, which corresponds to a different function. For example, the sensing unit 210 can detect the angle of the touch end 10 with respect to the display touch surface 4000 to generate the motion signal, wherein different angles correspond to different motion signals. Particularly, each motion signal corresponds to a respective function, wherein the function may include receiving/sending an email, displaying a selection list, moving the pointer or other functions as appropriate. In addition, the touch end 10 is an electrode, which can electrically couple with the display touch surface to provide a better sensing effect and to solve the poor sensing problem.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

The invention claimed is:

1. A touch input device, comprising:
   a touch end;
   a sensing module, comprising:
   a sensing unit for determining whether the touch end contacts a display touch surface or the touch end suspends over the display touch surface by a floating distance and for detecting a relative angle between the touch end and the display touch surface to generate a motion signal, so that in the same relative angle, the motion signal generated when the touch end contacts the display touch signal is different from the motion signal generated when the touch end suspends over the display touch surface by the floating distance; and
   a signal operation unit generating a result signal according to the motion signal, wherein the result signal generated according to different motion signals corresponds to different functions to be executed; and a receiving module, comprising:
   a receiving end receiving the result signal; and
   a demodulator unit coupled with the receiving end, wherein the receiving end transmits the result signal to the demodulator unit, and the demodulator unit generates a function signal for executing the function corresponding to the result signal.

2. The touch input device of claim 1, further comprising:
   a shaft member, wherein the sensing module is disposed in the shaft member and the touch end is disposed on one end of the shaft member; the sensing unit detects the relative angle of the shaft member and the touch end with respect to the display touch surface to generate the motion signal.

3. The touch input device of claim 2, wherein the motion signal includes a touch signal; when the touch end contacts the display touch surface and the shaft member includes a predetermined angle with the display touch surface, the sensing unit generates the touch signal.

4. The touch input device of claim 2, wherein the motion signal includes a floating signal; when the touch end is away from the display touch surface by the floating distance and the shaft member includes a predetermined angle with the display touch surface, the sensing unit generates the floating signal.

5. The touch input device of claim 2, wherein the motion signal includes a rotating signal; when the touch end contacts and is positioned on the display touch surface and with the touch end as a center of rotation, the shaft member rotates a rotation angle along a reference direction, the sensing unit generates the rotating signal.

6. The touch input device of claim 1, wherein the touch end has a concave face and an inclined face and the motion signal includes a swinging signal;

when the touch end contacts and is positioned on the display touch surface, the shaft member swings a swing angle with the touch end as a center of swing, and the concave face and the inclined face rotate along the display touch surface, the sensing unit generates the swinging signal.

7. The touch input device of claim 2, wherein the motion signal includes a rest signal; when the touch end contacts and is positioned on the display touch surface and the shaft member maintains at a reset angle with respect to the display touch surface for a predetermined period of time, the sensing unit generates the rest signal.

8. The touch input device of claim 2, wherein the motion signal includes a suspending signal; when the touch end is away from the display touch surface by the floating distance and the shaft member maintains a suspension angle with the display touch surface for a predetermined period of time, the sensing unit generates the suspending signal.

9. The touch input device of claim 1, wherein the display touch surface includes a first display touch face and a second display touch face; the motion signal generated by the sensing unit when the touch end acts on the first display touch face and the motion signal generated by the sensing unit when the touch end acts on the second display touch face are different.

10. The touch input device of claim 1, wherein the display touch surface includes at least one touch hole; the touch end is positioned in one of the at least one touch hole.

11. The touch input device of claim 1, wherein the display touch surface includes at least one touch bump; the touch end is positioned on one of the at least touch bump.

12. The touch input device of claim 3, wherein magnitude of the motion signal is proportional to a value of the predetermined angle.

13. The touch input device of claim 5, wherein magnitude of the motion signal is proportional to a value of the rotation angle.

14. The touch input device of claim 1, further comprising:
a display integration module including the display touch surface.

15. The touch input device of claim 14, wherein the receiving module is disposed in the display integration module; the signal operation unit transmits the result signal to the receiving end by a communication protocol.

16. The touch input device of claim 1, wherein the receiving end is coupled with the display touch surface; when the touch end contacts the display touch surface, the signal operation unit transmits the result signal to the receiving end.

17. The touch input device of claim 1, wherein the sensing module further comprises:
a signal-amplifying unit coupled between the sensing unit and the signal operation unit, wherein the signal-amplifying unit amplifies the motion signal and transmits the motion signal to the signal operation unit.

18. The touch input device of claim 1, wherein a shape of the touch end includes a plane, a curve face, or a conical face.

* * * * *